Patented Mar. 7, 1933

1,900,381

UNITED STATES PATENT OFFICE

WALDEMAR C. HANSEN, OF WESTFIELD, NEW JERSEY, ASSIGNOR TO AMERICAN CYANAMID COMPANY, OF NEW YORK, N. Y., A CORPORATION OF MAINE

SYSTEM FOR PRODUCING GYPSUM

No Drawing.   Application filed June 9, 1931. Serial No. 543,241.

The present invention relates to a method of treatment of acidulous by-product gypsum and specifically to a method of removal of or neutralization of the free acid therein so as to produce a neutral or substantially neutral calcined product.

In the production of phosphoric acid by the digestion of phosphate rock with sulphuric acid, there is produced a by-product gypsum containing some residual acid. This by-product gypsum may be used upon proper treatment thereof to produce a calcined product known as calcium sulphate hemihydrate or plaster of Paris which upon hydration with water has been found to be extremely useful as a plaster. By plaster is meant a plastic mix which will set into a hard product whether that product is a set shape or wall plaster.

It has been developed through extensive experimentation and tests that the residual acid in this by-product gypsum is of two types. The first type is that acid which may be readily neutralized prior to calcination and the second, that acid which cannot be neutralized prior to calcination.

The acid occurring in this by-product gypsum may be either phosphoric or sulphuric or both, and occurs therein by reason of the fact that in the usual commercial system of treatment, it has not been found practical heretofore to wash the gypsum entirely free thereof. This acid occurs in the by-product gypsum as an admixture with the gypsum which portion of acid may be readily neutralized by the addition of neutralizing agent, and also as acid occluded or physically held within the crystal structure of the gypsum. This latter portion of acid being completely encased by or enclosed within the calcium sulphate, it may not be readily neutralized by admixture with neutralizing agent. When this product is subjected to a calcining operation in kettles or the like, the calcium sulphate dihydrate loses a part of its water of crystallization to form the hemi-hydrate and in so doing becomes very porous. This action permits the liberation of that portion of the free acid theretofore occluded or held within the crystal so that neutralization of this portion of the acid may be effected during or after calcination, but not before.

Through repeated experiments and tests of a set plaster made from this hemihydrate, it has been determined that in some instances it is extremely desirable that all of the acid, that is, both that capable of neutralization prior to calcination and capable of neutralization only during or subsequent to calcination, shall be treated so as to produce a neutral or substantially neutral calcined product.

The invention is, therefore, particularly concerned with the treatment of this acidulous by-product gypsum so that as much of this acid carried over from the phosphate rock-sulphuric acid reaction, shall be mechanically removed, in order to dispense with the cost of neutralizing agent, and to neutralize chemically the remaining acid in the gypsum at such a time in the procedure and in such a manner as will insure effective neutralization with minimum quantities of neutralizing agent.

In carrying out the invention in one of its forms, and as applied to actual commercial operations, the by-product gypsum is removed from the settling tanks or filter medium as the case may be, by means of water so as to present a slurry for further treatment. This slurry is treated in an apparatus of which the Dorr thickener is a type, so as to remove a part of this acid and to de-water partially the mass of gypsum crystals.

It has been proposed heretofore to re-slurry this de-watered stock with fresh water and to add a neutralizing agent thereto for the purpose of chemically eliminating the residual acid therein. This is expensive by reason of the fact that the gypsum at that point in the procedure is not in such a condition that all of the acid may be neutralized, for the reason above set forth. Even though a portion of the acid were neutralized at this point, an additional amount of neutralizing agent would still be required to take care of the developed acid or acid set free during the calcining operation. The proposed procedure, therefore, entails two complete neutralization steps. Another objection to neutralization of the slurry from the thickener is that in commercial operations it is extremely difficult to determine the exact amount of neutralizing agent necessary to combine with this free acid, with the result that an excess is usually added. As heretofore proposed, this slurry containing an excess amount of neutralizing agent is then fed to centrifuges where a second de-watering takes place. It will be apparent that in this step of the operation, some of the excess neutralizing agent is likewise removed along with the water and consequently lost. For these reasons, the proposed procedure is expensive and inefficient.

In carrying out the treatment according to the present invention, the thickened and partially de-watered slurry from the Dorr thickener may contain from .1 to 3% acid. This slurry is fed directly to the centrifuges for substantially complete de-watering. The cake from the centrifuge is substantially dry and it has been found that in this de-watering operation the acidity of the gypsum cake may be decreased materially. This reduction in acid, therefore, may be effected by the simple centrifuging of the thickener slurry without the interposition of a neutralizing step.

The contained acid in the centrifuge cake may be further reduced by simple washing in the centrifuge with fresh water. While washing in the centrifuge is desirable, yet it is not absolutely essential.

This substantially dry centrifuge cake may then be passed to the calcining kettles for treatment in the usual manner to remove a portion of the water contained in the gypsum crystals with a production of calcium sulphate hemihydrate. During the calcining operation, the gypsum crystals become very porous with the liberation of the contained or occluded acid, making this acid available for neutralization, which was not possible prior to calcination.

It has been found that the calcining kettle affords an efficient location for the neutralization of this contained acid by adding thereto a neutralizing agent for there the contained acid is neutralized as it is liberated. Due to the fact that in the calcining kettle the dehydrating effect causes the gypsum to boil violently, efficient stirring takes place with the result that any neutralizing agent added at that point is efficiently distributed throughout the mass.

An efficient neutralizing agent has been found to be lime, either in a dry state or in slurry form. The latter is preferred by reason of the fact that if dry lime is added there is a tendency to lose some of this material which may be carried up through the stack with the evaporating water. This loss, however, is not appreciable and hence the invention is to be construed as covering the addition of a neutralizing agent either in dry or slurry form. If dry lime is to be added at this point, it is preferable to add in the neighborhood of 2 lbs. per ton, and as the calcining kettles as operated usually have a capacity of about 8 tons, approximately 20 lbs. of lime per kettle will be found sufficient to neutralize completely any acid developed there. As a matter of fact, an excess of lime added at this point will not prove detrimental to the calcined product as it is often necessary to add lime in preparing wall plaster in order to increase the plasticity thereof. If the lime is to be added to the kettle in slurry form, it is preferable to add the same in the proportion of about 2.4 lbs. per gallon of water, a charge of six gallons being sufficient for a kettle containing 8 tons.

If no neutralization takes place in the kettle, the acidity of the calcined product has been found to have materially increased over that of the washed or unwashed centrifuge cake. The acidity of this calcined product is frequently as high as .4%. However, this acidity may be completely eliminated and neutralized by the addition of the neutralizing agent as above set forth.

The thus produced hemihydrate may be used as such for wall plaster or set shapes either without further treatment or after passing through a ball mill or the like and with or without additions of lime, accelerator or retarder, fillers such as sisal fiber, hair, wood chips, clay or the like, and sand.

From the above it will be apparent that the present invention makes possible the elimination of slurrying the thickener mass with fresh water, and consequently one de-watering operation. It may eliminate the chemical neutralization of that quantity of acid available prior to calcination with the consequent saving in cost of the neutralizing agent by substituting therefor mechanical washing in the centrifuge. In addition to the above, the procedure makes possible the efficient and complete neutralization of that acid developed or set free in the calcining operation which the neutralizing agent prior to that step was unable to reach. As a result, acidulous by-product gypsum may be efficiently treated with the minimum number of steps and with only that quantity of neutralizing agent actually necessary for neutralizing without loss of any portion thereof.

While the invention has been described with particular reference to certain steps constituting a complete procedure, yet obviously I do not wish to be limited strictly thereto but the invention is to be construed broadly and limited only by the scope of the claims.

I claim:

1. A process of treating acidulous by-product gypsum which comprises subjecting the same to a calcining operation in the presence of a neutralizing agent.

2. A process of treating acidulous by-product gypsum which comprises subjecting the same to a calcining operation in the presence of a dry neutralizing agent.

3. A process of treating acidulous by-product gypsum which comprises subjecting the same to a calcining operation in the presence of a neutralizing agent in slurry form.

4. A process of treating acidulous by-product gypsum which comprises subjecting the same to a calcining operation in the presence of a neutralizing agent in slurry form, said neutralizing agent comprising approximately 2.4 lbs. lime per gallon of water, per ton of gypsum.

5. A process of treating acidulous by-product gypsum which comprises subjecting the same to a calcining operation in the presence of lime.

6. A process of treating acidulous by-product gypsum which comprises subjecting the same to a calcining operation in the presence of lime in the proportion of about 2 lbs. per ton.

7. A process of treating acidulous by-product gypsum which comprises adding the same to a calcining kettle, adding thereto a neutralizing agent, and calcining the mixture.

8. A process of treating acidulous by-product gypsum which comprises adding the same to a calcining kettle, adding thereto a slurry containing a neutralizing agent, and calcining the mixture.

9. A process of treating acidulous by-product gypsum which comprises adding the same to a calcining kettle, adding thereto lime in the proportion of about 2 lbs. per ton, and calcining the mixture.

10. A process of treating acidulous by-product gypsum which comprises subjecting the same to a calcining operation in the presence of a neutralizing agent in an amount sufficient to neutralize the free and developed acid in the by-product gypsum.

11. A process of treating acidulous by-product gypsum which comprises adding the same to a calcining kettle, adding thereto a neutralizing agent in an amount sufficient to neutralize the free and developed acid in the by-product gypsum and calcining the mixture.

12. A process of treating acidulous by-product gypsum containing free acid and occluded acid which comprises washing the free acid therefrom, delivering the dewatered cake to a calcining kettle, adding a neutralizing agent thereto and calcining the mixture whereby the occluded acid will be set free and neutralized.

13. A process of treating acidulous by-product gypsum containing free and occluded acid which comprises passing a slurry containing the same to a centrifuge, de-watering the gypsum therein to remove a portion of the free acid, washing the cake in the centrifuge to remove an additional portion of the free acid, passing the centrifuge cake in a calcining kettle, adding thereto a neutralizing agent, and calcining the mixture, whereby the occluded acid will be set free and the residual free and occluded acid neutralized thereby.

14. A process of treating acidulous by-product gypsum containing free acid and occluded acid which comprises washing the free acid therefrom, delivering the dewatered cake to a calcining kettle, adding a neutralizing agent thereto and calcining the mixture whereby the occluded acid will be set free and neutralized, the neutralizing agent being added in an amount sufficient to produce a substantially neutral product.

15. A process of treating acidulous by-product gypsum containing free and occluded acid which comprises passing a slurry containing the same to a centrifuge, de-watering the gypsum therein to remove a portion of the free acid, washing the cake in the centrifuge to remove an additional portion of the free acid, passing the centrifuge cake to a calcining kettle, adding thereto a neutralizing agent, and calcining the mixture, whereby the occluded acid will be set free and the residual free and occluded acid neutralized thereby, the neutralizing agent being added in an amount sufficient to produce a substantially neutral product.

In testimony whereof, I have hereunto subscribed my name this third day of June, 1931.

WALDEMAR C. HANSEN.